June 16, 1925.
W. F. TERRY
AUTOMOBILE SIGNAL
Filed June 13, 1923
1,542,017
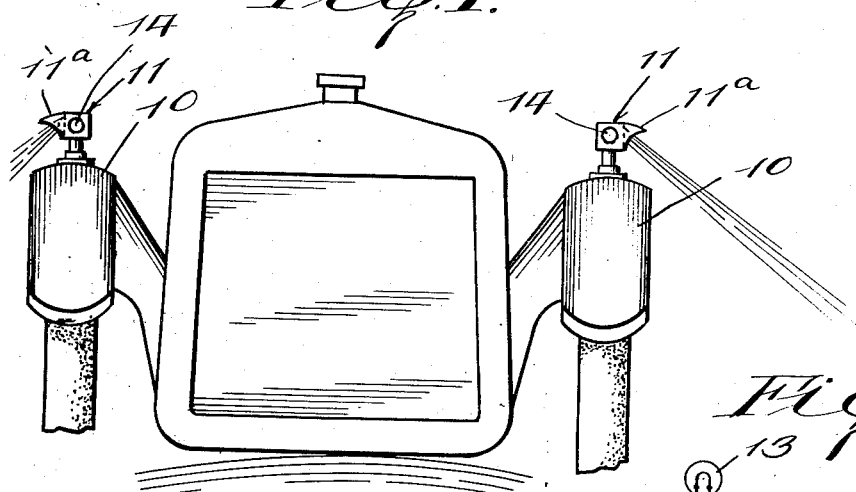
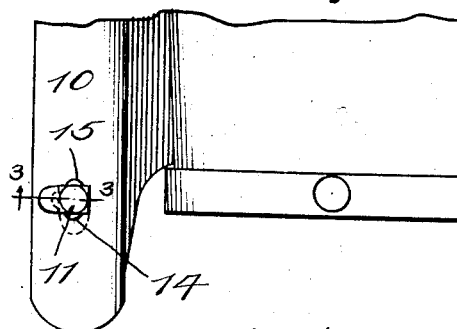
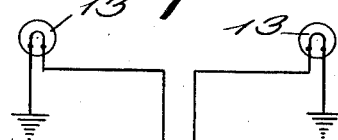
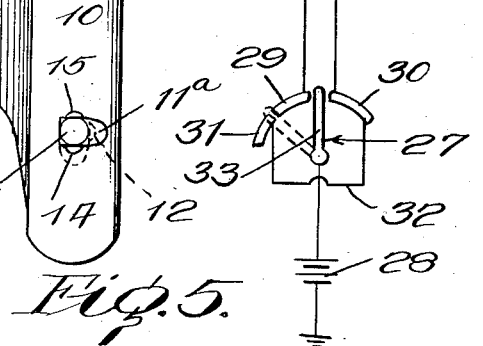
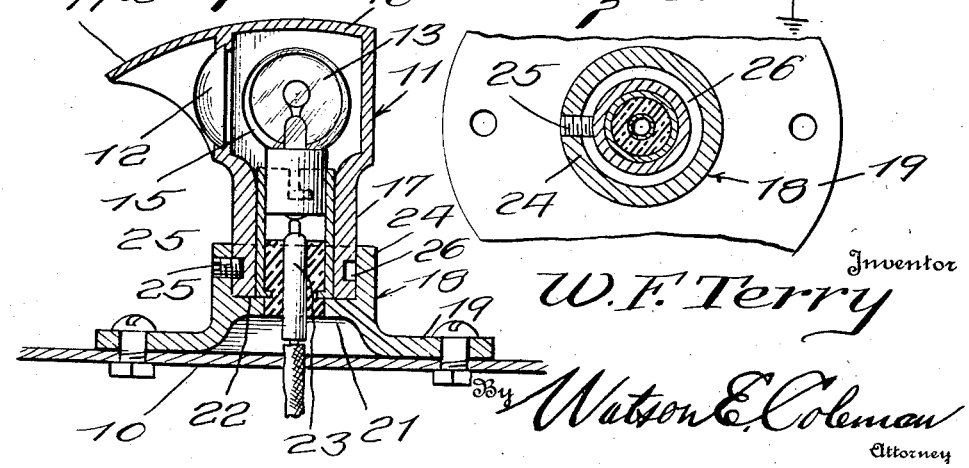
Inventor
W. F. Terry
By Watson E. Coleman
Attorney Patented June 16, 1925.

1,542,017

UNITED STATES PATENT OFFICE.

WILLIAM F. TERRY, OF WASHINGTON, DISTRICT OF COLUMBIA.

AUTOMOBILE SIGNAL.

Application filed June 13, 1923. Serial No. 645,171.

*To all whom it may concern:*

Be it known that I, WILLIAM F. TERRY, a citizen of the United States, residing at Washington, in the District of Columbia, have invented certain new and useful Improvements in Automobile Signals, of which the following is a specification, reference being had to the accompanying drawings.

This invention relates to automobile signals and more particularly to a device of this character for indicating proposed turning movements of the vehicle.

A further object of the invention is to provide a device of this character which is capable of a plurality of uses. It is wellknown to those familiar with the operation of automobiles that in the majority of cities where the traffic is extensive it is desirable that a vehicle be provided with some sort of signaling mechanism readily visible when in operation not only from the front of the machine, where it may be observed by a traffic officer whom the machine is approaching or by machines traveling in the opposite direction, but from the rear so the following vehicles may be warned of the driver's intention. It is further wellknown that it is necessary in cities where the traffic is heavy to provide certain streets upon which vehicles may only travel in one direction and upon which streets vehicles are parked at either side of the street. The parking regulations require that the vehicle when parked shall be provided with a light at night which is visible both from the front and rear of the vehicle and which is disposed at the outside of the vehicle when positioned at the curb. Since vehicles are not always parked at the same side of the street it is necessary in order to provide proper lighting that two parking lights be employed. Further, in practically all localities the driving of automobiles at night without lights is prohibited unless the vehicle is being operated to move the same to a point where the lights thereof may be repaired and in such instances the vehicle must move very slowly. Even when moving slowly the driver of the vehicle is subjected to the necessity of frequently stopping his vehicle to answer questions put by traffic policemen to observe the machine operating without lights. It is, accordingly, an important object of this invention to provide a signaling mechanism for indicating the intended direction of turning a vehicle, including elements which may be employed as parking lights and which are arranged at opposite sides of the vehicle and which further in emergency may be employed as front lights for the vehicle so that the vehicle may operate at a normal speed upon failure of the headlights thereof.

A further object of the invention is to produce a device of this character which may be very cheaply manufactured and which is readily operated.

These and other objects I attain by the construction shown in the accompanying drawings, wherein for the purpose of illustration is shown a preferred embodiment of my invention and wherein:—

Figure 1 is a fragmentary front elevation of an automobile showing signal lights applied thereto in accordance with my invention;

Figure 2 is a fragmentary plan view thereof;

Figure 3 is an enlarged sectional view on the line 3—3 of Figure 2;

Figure 4 is a wiring diagram; and

Figure 5 is a transverse sectional view showing the mounting of the signal light in its support.

Referring now more particularly to the drawings, the numeral 10 indicates the front fenders of an automobile upon each of which is installed a signal light 11. Each signal light 11 embodies a side lens 12 by means of which the rays of the illuminating element 13 are directed to the side of the vehicle, a forwardly directed lens 14 by means of which the rays are directed forwardly of the vehicle, and a rearwardly directed lens 15 by means of which the rays are directed rearwardly of the vehicle, the lenses 14 and 15 being preferably formed of translucent material and being white and red in color, respectively. The signal element 11 comprises a casing 16 in which the lenses 12, 14 and 15 are mounted having a tubular extension 17 at its lower end which communicates with the interior thereof. The lenses 12, 14 and 15 may be mounted in the casing in any desired manner, the casing being provided about the lens 12 with a cowl 11ª restricting the rays passing through the lens 12 so that they incline downwardly from the horizontal. The numeral 18 designates an attaching base by means of which the signal 11 is secured to the fender, this base being cup-shaped and being provided at its lower end with an outwardly extending flange 19 through which securing elements 20 may be directed to secure the base to the fender 10. Through the bottom 21 of the cup-shaped attaching member 18 an opening 22 is formed in which is seated the lower end of the socket element 23 of the illuminating element 13 of the signal. The sleeve 17 snugly fits interiorly of the cup-shaped member to rest upon the upper surface of the bottom thereof and this sleeve is in turn snugly fit by the socket member 23 of the bulb or illuminating element 13. Through the side wall 24 of the cup-shaped mounting element a set screw 25 is directed which engages in a peripheral groove 26 formed in the outer surface of the sleeve. This set screw seating against the inner wall of this groove will maintain the element 11 against rotation, but when the set screw is loosened this element may be rotated to alter the direction of the lens 12 so that the same may be positioned either forwardly or to the side as is desired.

In the use of the device the signal elements are normally mounted upon the fenders so that the lenses 12 direct the rays outwardly from the sides of the vehicle and downwardly upon the ground. In combination with these elements a suitable switch 27 is employed whereby either of the elements 13 may be placed in circuit with a source of current 28 or both of these elements simultaneously placed in circuit with this source. In the present instance the switch is diagrammatically illustrated as including a pair of spaced contacts 29 and 30, one of which is connected with each of the elements 13, a third contact 31 positioned adjacent the contact 29 and electrically connected as at 32, with the contact 30, and a blade 33 which is electrically connected with the source of current 28. The spacing of the switch contacts 29 and 30 is such that when the blade 33 is positioned therebetween it does not contact with either thereof but may be moved into engagement with either thereof to cause illumination of the selected indicator or signal 11. The spacing of the contacts 29 and 31, however, is such that the switch blade 33 may simultaneously engage with both thereof so that both of the illuminating elements may be simultaneously actuated.

In the use of the signaling devices, if the operator of the vehicle desires to turn to the right the switch blade 33 is actuated to complete the circuit to the illuminating element 13 of the signal 11 disposed upon the right fender, with the result that a beam of light is directed to one side of the vehicle and downwardly upon the ground where it will be readily noticeable to persons either in advance of or behind the vehicle upon which the signals are provided. If it is desired to indicate a "left" turn the switch is actuated to complete the circuit of the illuminating element of the left-hand signal element. If desired, both signal elements may be simultaneously actuated by positioning the switch so that it engages both the contacts 29 and 31 to indicate a stop. If it is desired to park the machine the machine is run to the curb with either side thereof to the curb and the switch operated to light the illuminating element of the signal element disposed upon that fender remote from the curb. In event of failure of the headlights during operation of the machine the operator may rotate the signal elements 11 to direct the lenses 12 thereof forwardly and position the switch so that it simultaneously engages the contacts 29 and 21, the vehicle being thereby supplied with supplemental lights temporarily supplanting the ordinary headlights and permitting the operator to proceed at the usual rate of speed. It is pointed out that these objects are accomplished by apparatus only slightly exceeding in cost the cost of a pair of ordinary parking lights and that they will provide an efficient signal in addition to performing other functions not ordinarily performed by direction signals. It will be obvious that the construction of the signal element as hereinbefore set forth is capable of considerable change and modification without in any manner departing from the spirit of my invention and I accordingly do not limit myself to such specific structure except as hereinafter claimed.

I claim:—

1. In combination with a vehicle, a combined emergency headlight and signal element mounted at each side and at the forward end of the vehicle for rotative adjustment thereon, means for securing the signals in adjusted positions, an illuminating element in each signal element and means for selectively or simultaneously controlling said illuminating elements, said signal elements each embodying means for directing a beam of light from the illuminating element thereof outwardly from the signal element in one direction, a second modulated beam horizontally outwardly from the signal element at substantially right angles to the first named beam and a third beam likewise modulated but differing from the second beam outwardly from the signal element in the opposite direction from and in alignment with said second beam.

2. In a signalling apparatus of the type described as a sub-combination, a signal element comprising a casing, an illuminating element within the casing, the casing having in one wall thereof a clear lens, a hood arranged upon the outer face of the signal element and associated with said lens for preventing passage of rays from the lens except those directed outwardly and downwardly from the signal element, said casing embodying other and opposed walls arranged at opposite sides of the illuminating element and at right angles to the first named wall, said walls having colored lenses, a base, an extension on the casing rotatably engaging the base and means for securing the casing in rotatably adjusted positions upon the base.

3. In a signalling apparatus of the type described as a sub-combination, a signal element comprising a casing, an illuminating element within the casing, the casing having in one wall thereof a clear lens, a hood arranged upon the outer face of the signal element and associated with said lens for preventing passage of rays from the lens except those directed outwardly and downwardly from the signal element, said casing embodying other and opposed walls arranged at opposite sides of the illuminating element and at right angles to the first named wall, said walls having colored lenses, a tubular extension on the casing having an annular groove in the outer wall thereof, a socket for the illuminating element having a sliding fit interiorly of said tubular extension, a cup-shaped support for the signal in which the outer surface of the tubular extension has a sliding and rotating fit and a securing element extending through the wall of the cup-shaped support and engaging in the groove of said tubular extension and against the base thereof to lock the casing against rotation.

In testimony whereof I hereunto affix my signature.

WILLIAM F. TERRY.